S. F. Gates.
Umbrella
N° 65206.    Patented May 28, 1867
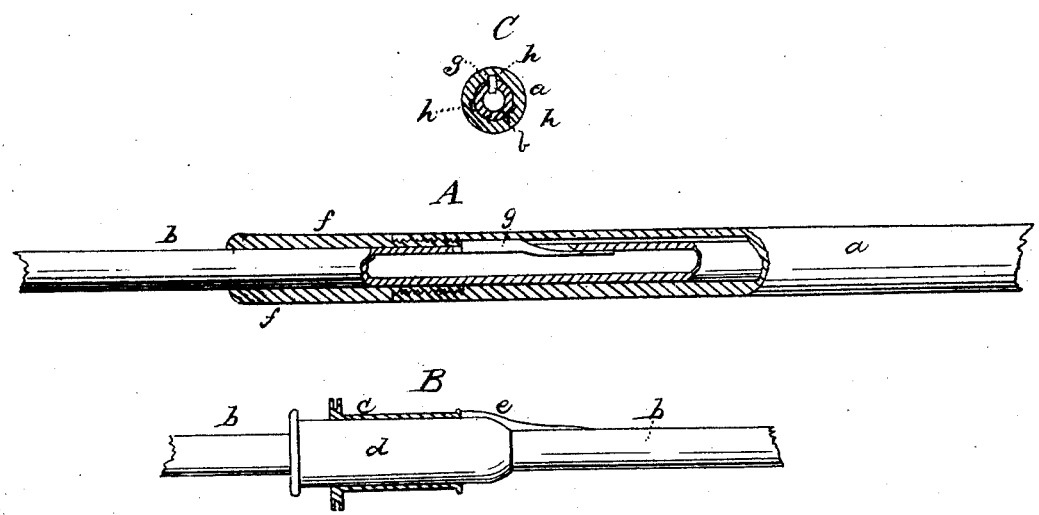
Witnesses
S. B. Kidder
M. W. Frothingham
Inventor
S. F. Gates by
Crosby & Gould
Attys

United States Patent Office.

STEPHEN F. GATES, OF BOSTON, MASSACHUSETTS.

Letters Patent No. 65,206, dated May 28, 1867.

---

IMPROVEMENT IN UMBRELLAS.

---

The Schedule referred to in these Letters Patent and making part of the same.

---

TO ALL WHOM IT MAY CONCERN:

Be it known that I, STEPHEN F. GATES, of Boston, in the county of Suffolk, and State of Massachusetts, have invented an Improvement in Umbrellas and Parasols; and I do hereby declare that the following, taken in connection with the drawings which accompany and form part of this specification, is a description of my invention sufficient to enable those skilled in the art to practise it.

United States Letters Patent, No. 21,324, dated August 31, 1858, were granted to A. G. Davis for an improvement in sun-shades and umbrellas, which improvement "consists in having the handle of the parasol or umbrella formed in two parts, one part being fitted into and allowed to slide in and out from the other, and used in connection with a stop and pressure-bar, slide, ferrule, and hub or boss, the whole being arranged so that the handle may be extended or lengthened as the implement is opened, and shortened as it is closed or folded; one movement or operation answering for the opening of the parasol and extending of the handle, and one movement for the closing of the same and shortening the handle." Said invention has proved to be a very practical and valuable improvement, and sun-shades embodying the same have been quite extensively manufactured. One defect, however, exists in the construction shown in the patent, and in all sun-shades made in accordance therewith, which defect is that the "ferrule," so called, or more properly the coupling which connects the two parts of the handle, or keeps them from separating, is apt to be turned on its screw by any accidental rotating movement of the upper part of the shade, causing said coupling to become loose and inefficient, and this defect it is my object to remedy.

My invention may be stated therefore as an improvement upon said patented construction, which improvement consists in constructing the tubular part of the handle to which the coupling is screwed, and in which the smaller rod or stem slides, with one or more longitudinal internal grooves in which the spring or "pressure-bar" projecting from the sliding-rod works, the presence of the spring keeping the rod and tube from relative rotation, and thus preventing any accidental loosening or unscrewing of the coupling.

The drawing represents so much of the handle of a parasol, umbrella, or sun-shade embodying my improvement as will enable the invention to be clearly understood: A showing the two parts of the handle, partly in section and partly in elevation; B, a view of the handle adjacent to the runner, showing the runner in section; C, a cross-section of the sliding-rod, and the tube in which it runs. $a$ denotes the main or lower part of the handle, made tubular, and receiving the rod $b$, to which the ribs are secured. $c$, the runner; $d$, the boss over which the runner is held by a spring-stop or latch, $e$, when the shade or umbrella is open. $f$ is the ferrule or coupling screwed upon the upper end of the tubular handle-piece $a$, its inner end making a shoulder against which the spring-stop $g$ brings up when the rod $b$ is drawn out to open the parasol or to lengthen the handle. Along the inner surface of the tubular handle $a$ are grooves $h$, into one of which the stop or feather $g$ is entered when the parts $a$ and $b$ are connected, this stop or feather following in this groove as the part $b$ is drawn out from and pushed back into the tube $a$. It will be obvious that with the parts so connected there can be no relative rotary movement of the tube $a$ and rod $b$, and that, by reason of this, the coupling or ferrule $f$ cannot be unscrewed or loosened upon the tube by accident. The purpose of the series of grooves $h$ is that if one gets worn away at the sides, so as to become inefficient, the feather or stop $g$ may be entered into one of the others by removing the cap or coupling $f$, and withdrawing the rod $b$, but the tube may of course be made with only one groove.

I claim, in combination with the tubular handle, sliding-rod, and feather or spring-stop, the groove or grooves in the tubular handle, operating as and for the purpose substantially as set forth.

STEPHEN F. GATES.

Witnesses:
J. B. CROSBY,
F. GOULD.